United States Patent
Conrad, Jr.

(10) Patent No.: US 9,516,821 B1
(45) Date of Patent: Dec. 13, 2016

(54) SELF-WATERING PLANTER INSERT ASSEMBLY

(71) Applicant: Michael L. Conrad, Jr., Bridgewater, NJ (US)

(72) Inventor: Michael L. Conrad, Jr., Bridgewater, NJ (US)

(73) Assignee: WaterWell Planters, Inc., Martinsville, NJ (US)

( * ) Notice: Subject to any disclaimer, the term of this patent is extended or adjusted under 35 U.S.C. 154(b) by 135 days.

(21) Appl. No.: 14/043,814

(22) Filed: Oct. 1, 2013

Related U.S. Application Data (63) Continuation-in-part of application No. 13/920,988, filed on Jun. 18, 2013.

(51) Int. Cl.
*A01G 27/06* (2006.01)
*A01G 27/00* (2006.01)

(52) U.S. Cl.
CPC ................... *A01G 27/005* (2013.01)

(58) Field of Classification Search
CPC ...... A01G 27/00; A01G 27/005; A01G 27/02; A01G 27/04; A01G 27/06; A01G 9/028
USPC ............... 47/65.5, 66.1, 79, 80, 81, 87, 48.5
IPC ..................... A01G 27/00, 27/02, 27/04, 27/06, A01G 9/02
See application file for complete search history.

(56) References Cited

U.S. PATENT DOCUMENTS

| | | | |
|---|---|---|---|
| 1,778,030 A | 10/1930 | Kanst | |
| 3,958,366 A | 5/1976 | Meyers | |
| 4,056,899 A | 11/1977 | Close | |
| 4,096,663 A | 6/1978 | Silver | |
| 4,299,054 A * | 11/1981 | Ware | 47/64 |
| 4,324,070 A * | 4/1982 | Swisher | 47/81 |
| 4,369,598 A * | 1/1983 | Beckwith | 47/61 |
| 4,805,343 A | 2/1989 | Patterson et al. | |
| 4,903,432 A * | 2/1990 | Velagaleti et al. | 47/81 |
| 4,962,613 A * | 10/1990 | Nalbandian | A01G 27/04 47/71 |
| 5,404,672 A * | 4/1995 | Sanderson | A01G 9/023 47/39 |
| 5,535,542 A | 7/1996 | Gardner et al. | |
| 5,749,170 A | 5/1998 | Furuta | |
| 5,901,497 A * | 5/1999 | Bulvin | 47/48.5 |
| 5,930,951 A * | 8/1999 | Wong | A01G 9/02 47/66.1 |
| D441,315 S * | 5/2001 | Huffman | D11/143 |
| 7,296,379 B1 | 11/2007 | Peter | |

(Continued)

*Primary Examiner* — Lisa Tsang
(74) *Attorney, Agent, or Firm* — M&B IP Analysts, LLC (57) ABSTRACT

A self-contained, low-maintenance planter insert assembly used indoors or outdoors in planters and other containers to provide prolonged self-watering of plants in a tray supported by its fluid-containing base member. A fill-tube and handle combination upwardly-depending from the tray helps lift and position a bottom perimeter notch against an interior rim in the base member for stable but readily-separable connection between them. Plant roots may be in growth/support medium distributed directly into the tray, or in drainable pots. Fluid-permeable material under the support medium allows surplus rainwater to refill the base member, and a wicking member or members extend from the base member to the tray distributing fluid upwardly to plant roots. No connections for power or water are needed for insert assembly function, and its tray has detachable rings for height-adjustment. Applications include, but are not limited to, residential and commercial use, including hotels, convention centers, malls, and schools.

17 Claims, 7 Drawing Sheets

(56) References Cited

U.S. PATENT DOCUMENTS

| | | |
|---|---|---|
| 7,392,616 B1 | 7/2008 | Bagby |
| 7,607,257 B2 | 10/2009 | Goldberg |
| 9,363,952 B2 * | 6/2016 | Zak ........................ A01G 9/023 |
| 2004/0010970 A1 * | 1/2004 | Baumann ........................ 47/65.5 |
| 2004/0148855 A1 * | 8/2004 | Caron ................................ 47/80 |
| 2005/0000159 A1 | 1/2005 | Billette |
| 2005/0011124 A1 | 1/2005 | Sanderson |
| 2008/0072492 A1 | 3/2008 | Olson |
| 2008/0302002 A1 | 12/2008 | Schmidt |
| 2009/0031629 A1 * | 2/2009 | Riesterer ........................ 47/66.7 |
| 2009/0077873 A1 | 3/2009 | Petersen et al. |
| 2011/0131879 A1 | 6/2011 | Altendorfer et al. |
| 2011/0162272 A1 | 7/2011 | Junkeer |
| 2012/0060415 A1 * | 3/2012 | Harbaugh ........................ 47/66.1 |
| 2013/0269250 A1 * | 10/2013 | Hung ........................ A01G 9/02 47/65.5 |

\* cited by examiner

SELF-WATERING PLANTER INSERT ASSEMBLY

CROSS-REFERENCES TO RELATED APPLICATIONS

This patent application relates to a U.S. non-provisional patent application filed by the same inventor herein and having the serial number of Ser. No. 13/920,988, which was filed on Jun. 18, 2013, and has the title of "Self-Watering Two-Piece Planter". Since the inventions in both applications have structural similarity to one another and common subject matter, the applicant herein respectfully requests a grant of domestic priority for this current patent application based upon his previously filed U.S. Ser. No. 13/920,988.

BACKGROUND

Field of the Invention

This invention relates to apparatus and systems used to provide water and/or nutrient/liquid to container-grown plants, specifically to a self-watering planter insert assembly comprising a tray with a perforated bottom surface and a fluid-containing base member or reservoir supporting the tray, which in combination are used within a planter or other container (decorative or non-decorative) to provide low maintenance, self-contained, and self-watering of a plant or plants having roots supported in the tray. A portion of the tray's bottom surface removably engages, and is supported at least in part by, a small interior circumferential rim inwardly projecting from the upper portion of the base member to provide secure positioning of the tray above the base member. In addition, the present invention planter insert assembly also preferably uses several stacked height-adjustment rings that can be selectively separated individually as needed from the top edge of the tray, such as but not limited to when the planter insert assembly is taller than the planter (or other container) intended for supporting it, and for enhanced decorative appeal of the plant/plants and planter combination it is desired for the present invention planter insert assembly to stay substantially hidden from view. One or more rings in stacked array may also be selectively added to the top edge of the tray (or to the top of an array of rings already secured to the top edge of the tray), with the amount of growth/support media needed in the tray to keep plants properly irrigated being one of the factors determining how many additional rings should be used.

The planter insert assembly of the present invention is low-maintenance and provides a significantly longer self-watering time period than is obtainable from most prior art self-watering systems in current use today for container-grown plants. Although the illustrations accompanying this disclosure show a planter insert assembly having a circular cross-sectional configuration, it may have any size or shape suitable for accommodation within the planter or other container selected for use with it, whether that planter or container has the cross-sectional configuration of a circle, rectangle, hexagon, or other regular or non-regular polygon, or an irregular arcuate perimeter configuration. Furthermore, more than one self-contained planter insert assemblies could be used within large containers, although a planter insert assembly nearly the same size and shape of the planter or other container with which it is to be used is currently the most common application. In addition, since the present invention planter insert assembly is typically hidden within a planter/container, it requires no decorative enhancement, although it may be made in a variety of colors or have various decorative surface texture patterns, designs, imprinted information, decals, informational stickers, and/or other decoration or attachment desired for marketing purposes. Depending upon the type and size of plants grown therein, indoor use of the present invention planter insert assembly may permit minimum maintenance-free periods of several months, with outdoor use permitting even longer maintenance-free periods when the planter insert assembly is positioned to benefit from rainwater replenishment, and if it rains often enough, no other water refill of its base member will be required. Another advantage of the planter insert assembly is that no municipal power or water supply connections are needed for its function, allowing it to service a wider variety of locations. Contemplated applications of the present invention planter insert assembly include use in planters and other containers located in and around public places, such as but not limited to, shopping malls, commercial buildings, hotels, convention centers, and college campuses. However, indoor and outdoor residential use by families and individuals are also considered important applications of the present invention and within its contemplated scope.

Furthermore, although not limited thereto, the most preferred embodiments of the present invention self-watering planter insert assembly comprise a base-member-to-tray volume that is approximately 4:1, although a minimum base-member-to-tray volume of least 2:1 is also contemplated. When a 4:1 nutrient/fluid-to-soil ratio is used, the self-watering time for plants grown indoors is at least two to three months, and longer self-watering time periods have been demonstrated for plants with low fluid requirements and those planter insert assemblies located outdoors and situated to receive at least occasional rainwater replenishment.

The tray of the most preferred embodiment of the present invention planter insert assembly is sturdily supported by its paired base member, and easily and readily removable from the base member (unless the tray is large in size and the weight of the fluid-saturated soil and plants therein makes it too heavy for one person to easily lift), with a connection between the upper and base members that is preferably provided by a strong and stable double-wall/double-ledge connection involving the previously mentioned small circumferential rim inwardly projecting from the upper portion of the base member's interior surface. A perimeter cutout/notch on the bottom exterior edge of the tray provides a vertically-extending wall that is configured to engage the inside surface of the base member (double-wall connection) above the small interior rim while the bottom surface of the tray adjacent to this wall engages the top surface of the interior rim (the first horizontally-extending ledge). The cutout/notch area also provides a stop, overhang, or inverted ledge (the second horizontally-extending ledge in the double-wall/double-ledge connection) that is in substantially perpendicular orientation to the vertically-extending wall and becomes wedged against the top perimeter edge of the base member for secure positioning of the upper and base members against one another when the tray is lowered into its desired position of use and it becomes supported by the base member.

In addition, the tray has a perforated bottom surface that allows surplus rainwater not needed immediately for plant irrigation to move downwardly via gravity into the base member for storage. The tray also has a fill-tube upwardly depending from its bottom surface for convenient routine fluid/nutrient replenishment without separation of upper and base members, and also for prompt and easy fluid/nutrient level assessment without having to move the tray or otherwise disturb plants and their support medium positioned in the tray. A handle is also positioned on the top of the fill-tube for easy lifting and lowering of the tray relative to the base member. Fluid-permeable material covers the perforations and blocks entry of the soil or other plant support/growing medium into the base member. Also, at least one wicking member is distributed across the fluid-permeable material (under the soil or other plant support medium) with a portion of it extending through one or more openings in the fluid-permeable material aligned with one or more of the perforations in the bottom surface of the tray (with multiple wicking members each typically inserted through a different paired opening/perforation from the others) to gradually draw nutrient/fluid from the base member upwardly into soil or other medium in the bottom surface of the tray that supports plant roots. Since its perforations allow surplus rainwater to exit the present invention tray via gravity and the wicking member or members only bring fluid into the tray from the base member until fluid saturation of the soil or other growth medium occurs, over-watering of plants grown in the tray is not possible, an important objective and advantage of the present invention so that plant roots are not harmed. In addition to other factors, the number of wicking members varies according to the size of the tray and the ambient temperature around the tray, as well as the age, number, and type of plants supported in the tray.

The base member also always has at least one overflow hole near its top edge, but with a portion thereof below its interior rim to prevent fluid already accumulated in the base member from blocking the downward flow of excess rainwater into the base member, which could otherwise saturate plant roots and cause them harm. In very large present invention planter insert assemblies, base members may also have a lower fluid drain opening (capped or otherwise sealed unless needed for drainage use). Plants are typically established in a soil or other growing/support medium distributed within the tray, however plants may also be in pots supported by the present invention tray as long as the pots allow plant roots to uptake water or nutrient/fluid at a rate that sustains plant growth. Advantages of the present invention planter insert assembly include structure that provides a constant/steady supply of water and fertilizer to plants, easy cleaning, no municipal power or water supply connections, significantly longer self-watering time periods than known prior art self-watering containers, durable construction, easy height adjustment, and easy/prompt installation and assembly.

Description of the Related Art

People enjoy having plants as a part of their surroundings, but depending upon their location, plants may require a lot of maintenance. Also, in heated and air-conditioned buildings, humidity is generally low, and more frequent watering of indoor plants is typically needed. Furthermore, indoor temperature, sunlight level, air drafts, and positioning near a door that subjects a plant to frequently changing local conditions, can have a significant affect on a plant's need for water and nutrients, and lead to additional time spent on planter monitoring and/or maintenance. Container-grown plants that are located outdoors and in patio areas can be subjected to even more variation in ambient temperature, sunlight level, and air movement, all of which will affect plant moisture requirements. The goal of the present invention is to provide a means of eliminating the daily labor that would otherwise be needed to keep container-grown plants and flowers properly irrigated for a significantly longer self-watering time period than is obtainable from most prior art self-watering systems in current use today for container-grown plants. While irrigation devices and systems are known for container-grown plants, no device or system is known with the same structure, same wicking system, an easy height-adjustment capability, or all of the other features and advantages found in the present invention.

While several prior inventions are known to have similarities in function and/or structure to the present invention, it is distinguishable from all of them. The invention disclosed in U.S. Pat. No. 4,056,899 to Close (1977) is a liquid-recycling planter with a base that functions as its reservoir. However, the Close invention is not a removable insert for use within an independent planter, and does not have detachable height adjustment rings. U.S. Patent Application Publication 2008/0072492 to Olson (2008) is also a plant watering/food dispensing system that can be imbedded in a plant growth pot. However, it is different from the present invention in that, as revealed in paragraph [0024] of the Olson disclosure, its container 11 of food and water would be inserted into a hole 21 in the pot, and positioned behind a door 24 to prevent household animals from drinking out of it. In contrast, the present invention is contemplated for insertion into an existing planter and the positioning of its tray does not allow animal access to fluids in its base member. In addition, the present invention would not work as contemplated with its base member secluded within in a specially constructed chamber behind a door. Furthermore, the Olson invention does not disclose self-contained system that allows excess rainwater to pass through perforations in a plant tray into a reservoir below for recycling. Similarly, while the inventions in U.S. Pat. No. 5,749,170 to Futura (1998), U.S. Pat. No. 7,607,257 to Goldberg (2009), U.S. Patent Application Publication 2005/0000159 to Billette (2005), and U.S. Patent Application Publication 2005/0011124 to Sanderson (2005), each disclose a potted plant situated directly over a reservoir, none comprises a perforated plant tray that helps to make the present invention into a self-contained system that allows excess rainwater to bypass plant roots and move through perforations in its plant tray via gravity into a reservoir below for recycling, or has connection of its tray and base member relying at least in part upon a small circumferential rim inwardly projecting from the upper portion of the base member's interior surface. No other planter insert assembly is known that functions in the same manner as the present invention, has the same structure disclosed herein, or provides all of the present invention's important advantages.

BRIEF SUMMARY OF THE INVENTION

It is the primary object of this invention to provide a self-contained, low-maintenance, and self-watering planter insert assembly for facilitated plant growth that provides a significantly longer self-watering time period than is obtainable from most prior art self-watering systems in current use today for container-grown plants and eliminates the daily labor that would otherwise be needed to keep container-grown plant foliage and flowers properly irrigated. It is a further object of this invention to provide a self-watering planter insert assembly for facilitated plant growth that permits base member fluid replenishment without movement or removal of plants, or their growth/support medium. Another object of this invention is to provide a self-watering planter insert assembly for facilitated plant growth that has strong and stable connection between is upper and lower/base members. It is also an object of this invention to provide a self-watering planter insert assembly for facilitated plant growth that allows fast and easy tray removal from its supporting base member, and fast and easy subsequent re-installation of the tray into its desired position of use. A further object of this invention is to provide a self-watering planter insert assembly for facilitated plant growth that has tray construction allowing excess rainwater to pass through it and enter the supporting base member beneath it for rainwater replenishment of the base member and prolonged self-watering time periods in outdoor applications. In addition it is an object of this invention to provide a self-watering planter insert assembly for planters and other containers with an option that allows easy selective adjustment of the height of the tray according to the type of plant to be supported by the tray and the height dimension of the planter or other container selected for present invention support. It is also an object of this invention to provide a self-watering planter insert assembly for facilitated plant growth which has a tray constructed for holding one or more drainable plant growth pots, or in the alternative may contain growth/support medium distributed directly into the tray for plant support, although having plant roots directly in the tray and supported by soil or other growth/support media is most preferred. It is a further object of this invention to provide a self-watering planter insert assembly for facilitated plant growth having irrigation means that evenly distributes fluid to differing portions of the tray. In addition, it is an object of this invention to provide a self-watering planter insert assembly for both indoor and outdoor applications, as well as residential and commercial use, such as but not limited to shopping malls, lobbies, parks, decorative entrances to public and private buildings and property, parking garages, commercial buildings, hotels, hospitals, convention centers, educational facilities, and college campuses.

The present invention, when properly made and used, provides a self-contained planter insert assembly that allows self-watering of a plant or plants positioned with their roots supported by a tray that is removably positioned upon a supporting base member having a proportionately larger fluid-holding interior volume than the tray it supports, to eliminate much of the daily labor that would otherwise be needed to keep container-grown plant foliage and flowers properly irrigated. Since the proportion of nutrient/fluid in the base member of the present invention to soil in its supported tray is at least 2:1, and most preferably approximately 4:1, the self-watering time for plants grown indoors is extended to at least two to three months, and longer for plants with low fluid requirements and planter inserts used outdoors that experience rainwater refill, resulting in a significantly longer self-watering time period than can be achieved with most prior art self-watering systems for container-grown plants in current use today. After the present invention's base member is filled with water or nutrient/fluid, the present invention tray (with the cutout/notch formed in its exterior perimeter bottom surface) is lowered onto top perimeter edge of the base member, as well as onto the top surface of an interior rim near the top edge. This forms a strong and stable double-wall/double-ledge connection between the upper and base members (the double-wall/double-ledge connection includes engagement with the circumferential rim near the top interior surface of the base member). The handle on top of the tray's fill-tube provide easy lifting and lowering of the tray. Multiple sizes and shapes for trays and base members are contemplated according to plant needs, including substantially circular cross-sectional configurations, that of a rectangular planter box, and/or other non-circular and non-rectangular cross-sectional configurations such as but not limited to hexagons and octagons. Plant roots may be in drainable pots supported by the tray, or in soil or other growth/support media distributed directly into the tray. Also, detachable rings added to or removed from the top surface of the tray can help to size the present invention planter insert assembly according to the size of the planter or other container with which it is used, and/or provide the optimal amount of space for support/growth media in the tray for proper plant irrigation. Furthermore, since the volume of support/growth media used in trays of the present invention defines the boundary of plant root growth, transfer of maturing plants to larger planters and in-ground sites is also facilitated. An optional lower drain opening in the base member can be capped or otherwise sealed until needed for use with a threaded cap, plug, or other similar means, should an application require such a drain opening for maintenance purposes, such as might be indicated by a need for winterizing very large embodiments of the present invention. Furthermore, although its base member may need periodic water/nutrient replenishment every few months, no municipal power or water supply connections are needed for proper function of the present invention. At least one wicking member extends upwardly from the supporting base member and into the supported tray via one or more perforations in the tray's bottom surface, and the wicking member or members are distributed within the tray for providing fluid evenly to differing portions of the tray. Fluid-permeable material is placed on the perforated bottom surface under the wicking member or members to prevent soil infiltration downwardly into the nutrient/fluid in the base member.

Furthermore, in the most preferred embodiments of the present invention self-watering planter insert assembly the fill-tube attached to its tray is typically used for adding water or nutrient/fluid to the base member when needed, and tray removal is not routinely required. In addition, the fill-tube can also be used for fluid/nutrient level assessment in the base member without having to move the tray or otherwise disturb plants and their support/growth medium. Also, in many present invention applications the top of the fill-tube will extend above the top edge of the tray's perimeter wall to reduce the opportunity for blockages caused by entry therein of soil or other plant growing media, however, it is also considered to be within the scope of the present invention for the fill-tube to have a height dimension substantially the same as, or less than, the height dimension of the tray. In addition, soil or plant growth support media in the containment space defined by wall structure upwardly depending from the bottom surface of the tray is often mounded toward center of the tray, although center mounding is not critical. Thus, in indoor and outdoor applications, the nutrient/fluid needed by plants daily is continuously transferred upwardly from the base member into the tray by the wicking member or members and distributed upwardly through the growth/support medium containing plant roots, with any excess rainwater in outdoor applications of the present invention planter insert assemblies not immediately needed by plant roots moving downwardly via gravity through the fluid-permeable material and also through the bottom surface perforations of the tray into the base member for storage and subsequent plant irrigation use. In addition, the number of wicking members varies according to the size of the tray, the ambient temperature and other ambient conditions (such as but not limited to drafts and wind) in the vicinity of the tray, as well as the size, age, number, type, and variety of plants grown in the tray. Also, the supporting base member typically has one or more over-fill prevention holes each with at least a lower portion thereof positioned below the inwardly-projecting and tray-supporting interior rim to prevent rising nutrient/fluid in the base member from reaching a level that could block the downward flow of excess fluid in the tray through its perforations, which if blocked would lead to saturation of plant roots that could eventually harm them. Applications include, but are not limited to, use for daily self-watering of plants in and around residential homes, shopping malls, commercial buildings, hotels, convention centers, and business and educational campuses.

BRIEF DESCRIPTION OF THE SEVERAL VIEWS OF THE DRAWINGS

FIG. 1 is a side view of the most preferred embodiment of the present invention self-watering planter insert assembly in an assembled configuration and showing its tray supported by its base member and each having a similar diameter dimension in the area of connection, one over-fill prevention hole through the top edge of the base member, several detachable height-adjusting rings in stacked array and secured to the top edge of the tray, a fill-tube centrally within the tray (although central positioning is not critical) that is also used for fluid/nutrient level assessment in the base member without having to move the tray or otherwise disturb plants and their support/growth medium, and a handle secured to the top of the fill-tube that is used for easily lifting and positioning the tray relative to the base member when the base member is already filled with fluid/nutrient and positioned within a planter or other container.

FIG. 5 is a section view of the most preferred embodiment of the present invention planter insert assembly showing a strong double-wall/double-ledge connection between the tray and the base member, one over-fill prevention hole in the top perimeter edge of the base member that is sized and positioned to prevent rising fluid in the base member from coming into direct contact with the bottom surface of the tray, multiple height-adjustment rings attached in a stacked vertically-extending array to the top edge of the tray, the preferably upwardly-tapering fill-tube that provides more volume within the tray for plants, the handle depending from the top end of the fill-tube, the fluid-permeable material substantially covering the perforated bottom surface of the tray, one wicking member distributed substantially over the fluid-permeable material with one of its ends extending through a perforation in the bottom surface of the tray that is aligned with a perforation in the fluid-permeable material so that the end of the wicking member can reach fluid/nutrient in the base member and transport the fluid/nutrient into the tray to roots of plants supported by growing media distributed therein, with FIG. 5 also showing a drain hole in the lower portion of the base member covered by a removable cap/seal.

COMPONENT LIST

1—most preferred embodiment of planter insert assembly
2—tray of planter insert assembly 1
3—base member of planter insert assembly 1
4—over-fill prevention hole in base member 3 (can have a closed perimeter, or not)
5—independently removable rings attachable in stacked array to the top edge of tray 2
6—fill-tube (for adding nutrient/fluid to base member 3 without separation of tray 2 from base member 3, and also used for fluid/nutrient level assessment in base member 3 without having to move or otherwise disturb plants and growth media positioning in tray 2, furthermore fill-tube 6 may be centered in tray 2, or not centered, according to need.)
7—handle associated with the top end of fill-tube 6 (used for lifting and positioning the tray 2 relative to base member 3, may be attached with a threaded connection to fill-tube 6 or be integral with fill-tube 6)
8—center bore through fill-tube 6 (used for adding nutrient/fluid to base member 3 and for assessment of the fluid/nutrient level in base member 3)
9—fluid-permeable material (one or multiple layers can be used to adjust the rate of gravity flow for travel of excess rainwater into base member 3)
10—wicking member (used to draw fluid/nutrient from base member 3 upwardly into tray 2)
11—double-wall/double-ledge connection between tray 2 and base member 3 that is provided by engagement of surfaces 11A and 11B with one another 11A—interior rim of base member 3
11B—cutout/notch area in bottom perimeter edge of tray 2
13—bottom surface of tray 2
14—perforations in the bottom surface 13 of tray 2 (used as drain holes for rainwater entering tray 2 that cannot be immediately used by plants, to transfer that surplus rainwater into base member 3 for later upward movement via wicking member 10 into tray 2)
15—interior ledge on ring 5 (used in combination with the indentation 16 on an adjacent ring 5 for vertical stacking of multiple detachable rings 5 one upon the other)
16—lower exterior indentation in ring 5 (engages ledge 15 for vertical stacking of multiple detachable rings 5 one upon the other)
17—bottom surface of base member 3
18—bottom portion of wicking member 10 that extends into the fluid/nutrient 19 housed in base member 3)
19—fluid/nutrient housed in base member 3 (drawn upward by wicking member 10 into tray 2)
20—drain hole in the lower portion of base member 3
21—removable cap/seal for drain hole 20
22—hole in fluid-permeable material 9 used for insertion of fill-tube 6 (if handle 7 is not removable from fill-tube 6, hole 22 may have end slits used for the extra expansion needed for hole 22 to successfully pass over handle 7 so that fluid-permeable material 9 is able to lay flat upon the bottom surface 13 of tray 2)
23—hole in fluid-permeable material 9 used for passage of a wicking member 10 into lower member 3
24—enlarged hole in tray 2 used for extension of a portion of wicking member 10 into base member 3
25—bottom edge of the vertically-extending wall portion in cutout/notch 11B
26—inverted ledge of cutout/notch 11B
27—top edge of base member 3

DETAILED DESCRIPTION OF PREFERRED EMBODIMENTS

Figure 1:
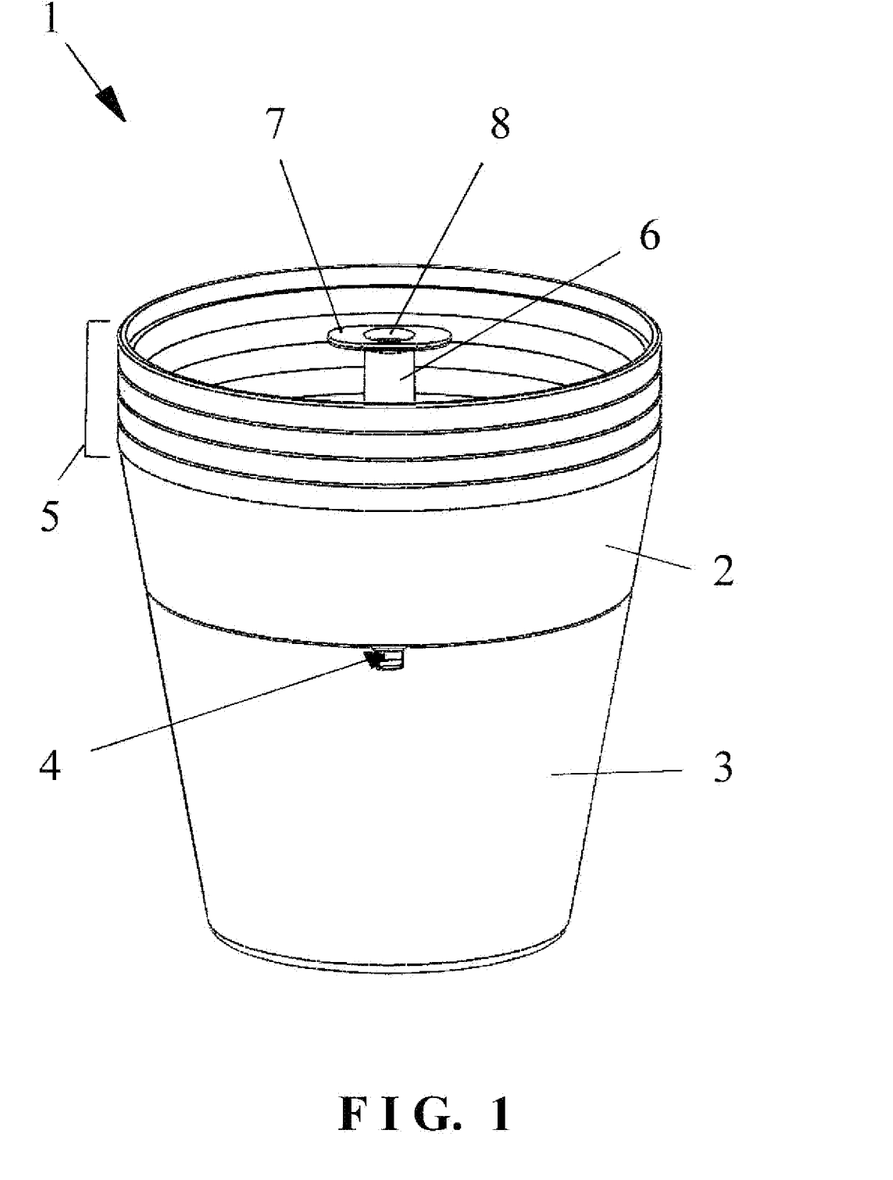
Figure 2:
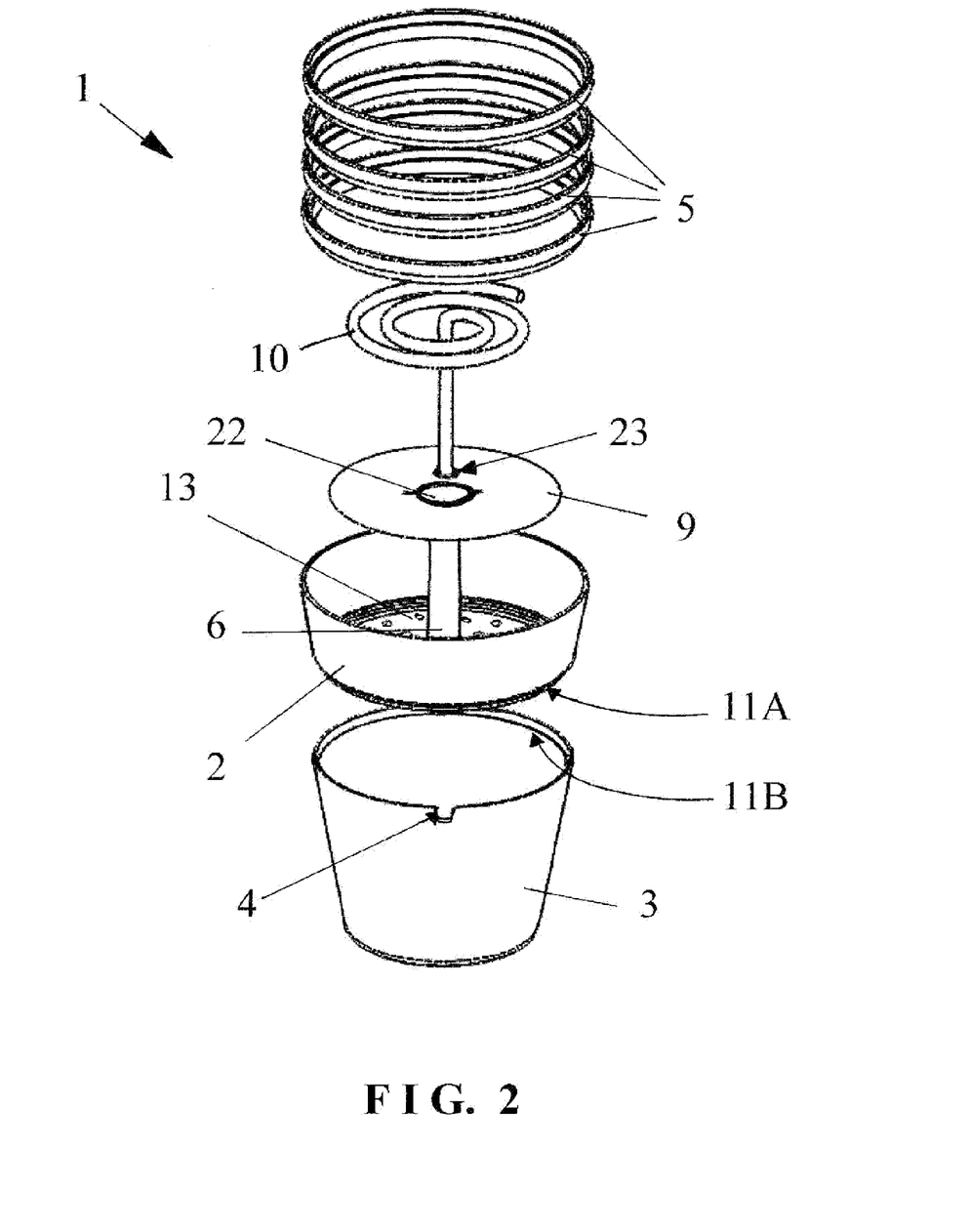
FIG. 2 is an exploded view of the planter insert assembly in FIG. 1 showing its height-adjusting rings are separable from one another, a loosely coiled wicking member having a downwardly-extending end, fluid-permeable material positioned under the wicking member and having a large opening for insertion therethrough of the tray's fill-tube and a smaller hole used for insertion of the wicking member, its tray having a perforated bottom surface, and a base member having an interior rim near its top surface, as well as one over-fill prevention hole near its top edge.
Figure 3:
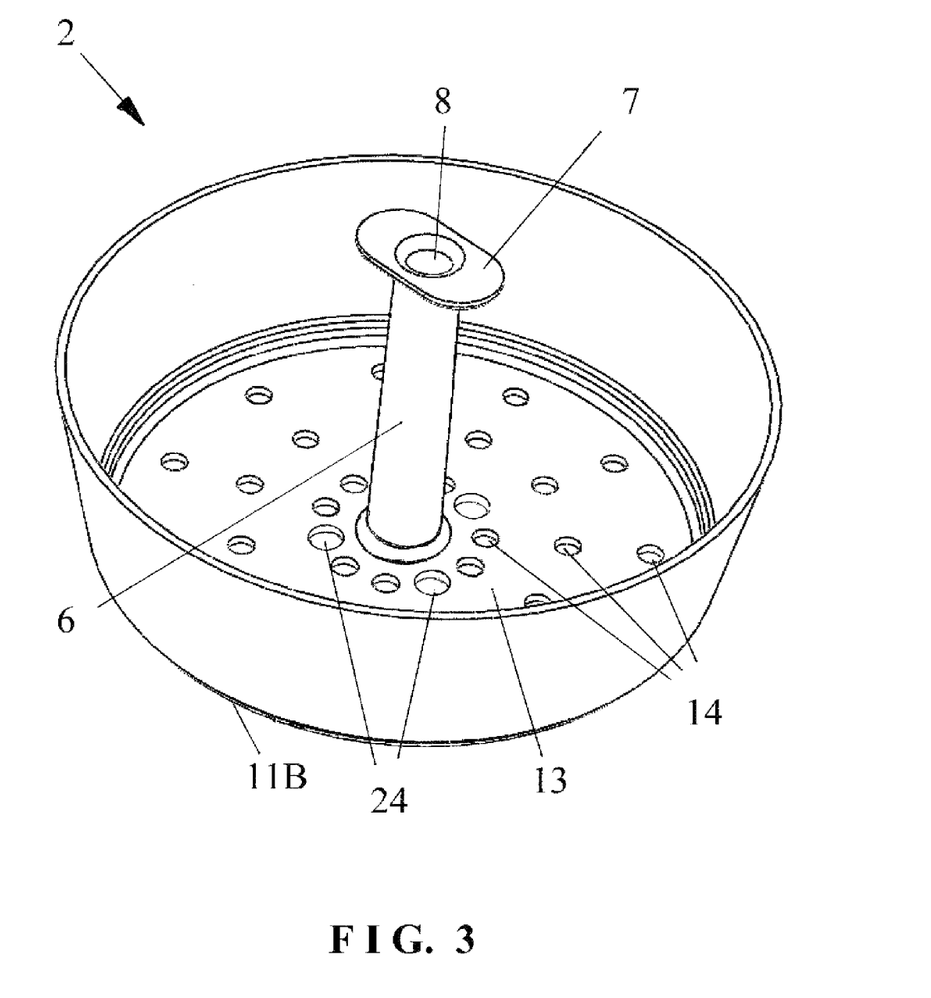
FIG. 3 is a perspective view of the tray in the most preferred embodiment of the present invention planter insert assembly showing its perforated bottom surface having larger and smaller perforations, a centrally-positioned fill-tube with a center bore and a top handle, and an exterior cutout/notch area around its bottom perimeter edge.
Figure 4:
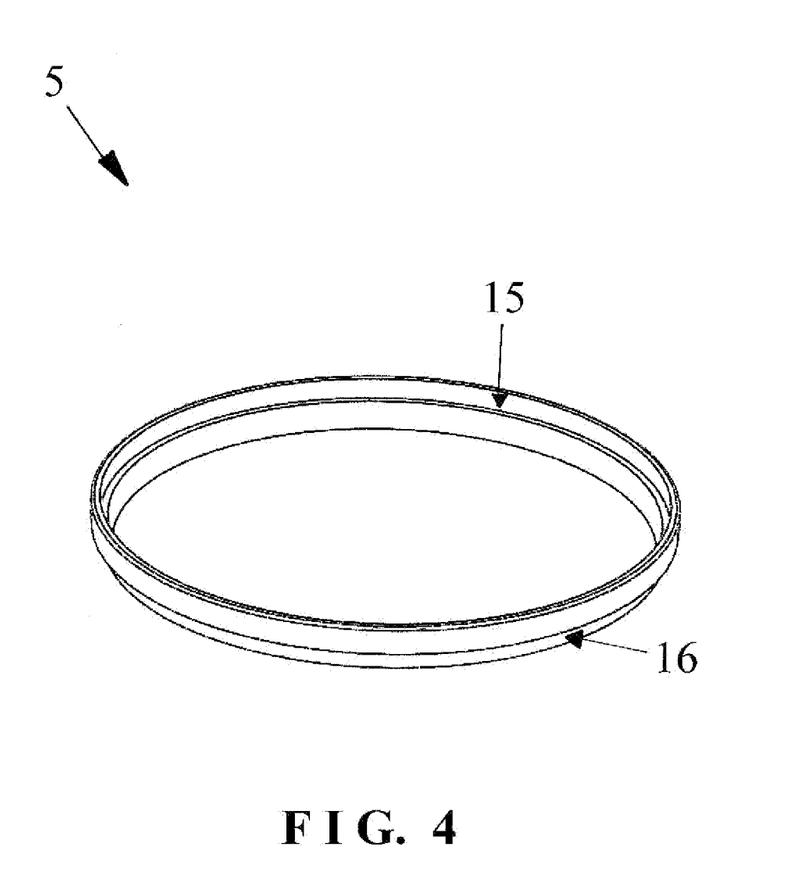
FIG. 4 is a perspective view of a ring usable as a part of the most preferred embodiment of the present invention planter insert assembly for height adjustment, and showing its interior ledge and the lower exterior indentation used for easily detachable engagement of adjacent rings to one another for vertical stacking of multiple rings one upon the other while the bottommost ring attaches to the top edge of the tray, as shown in FIG. 1.
Figure 5:
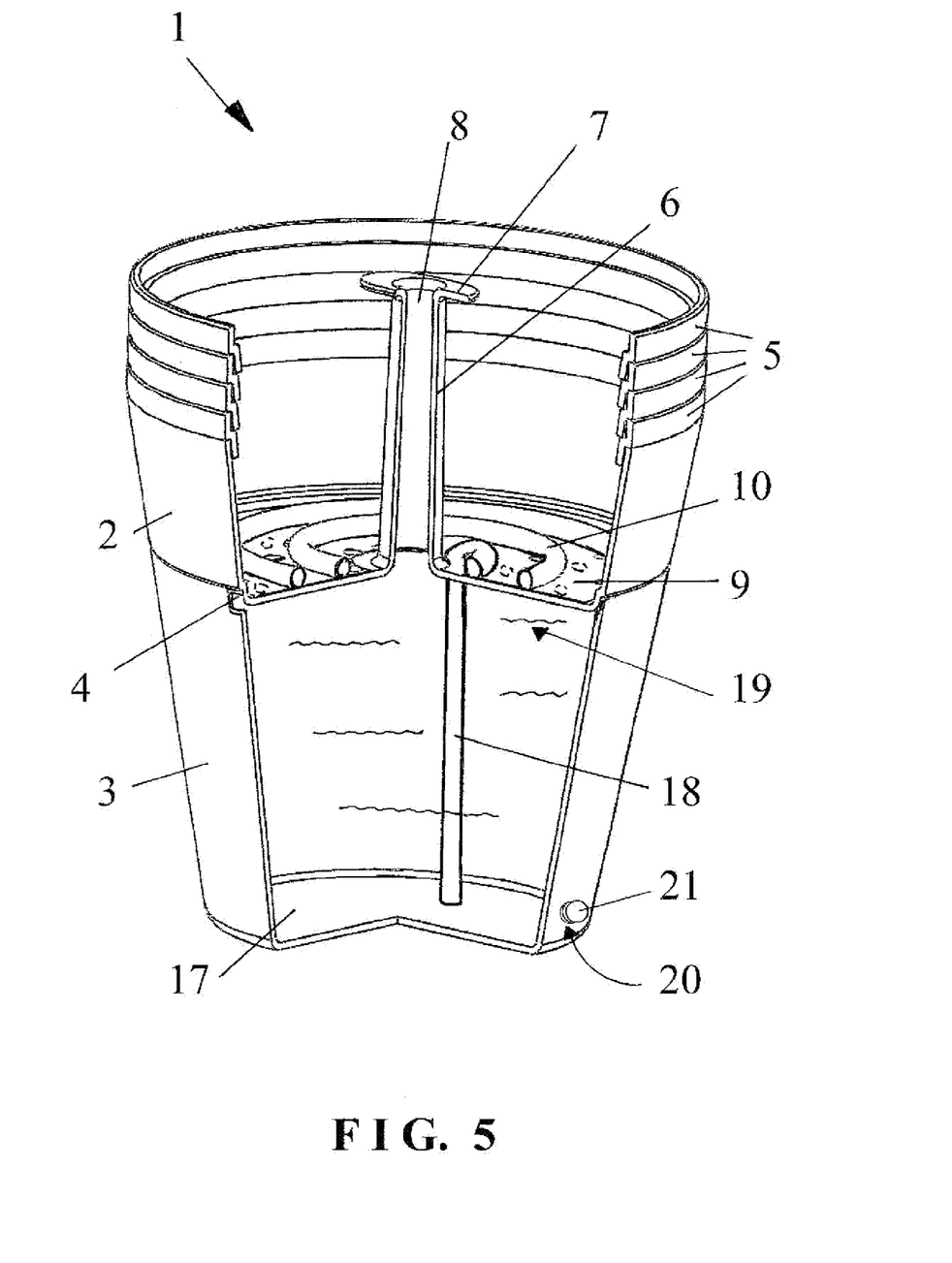
Figure 6:
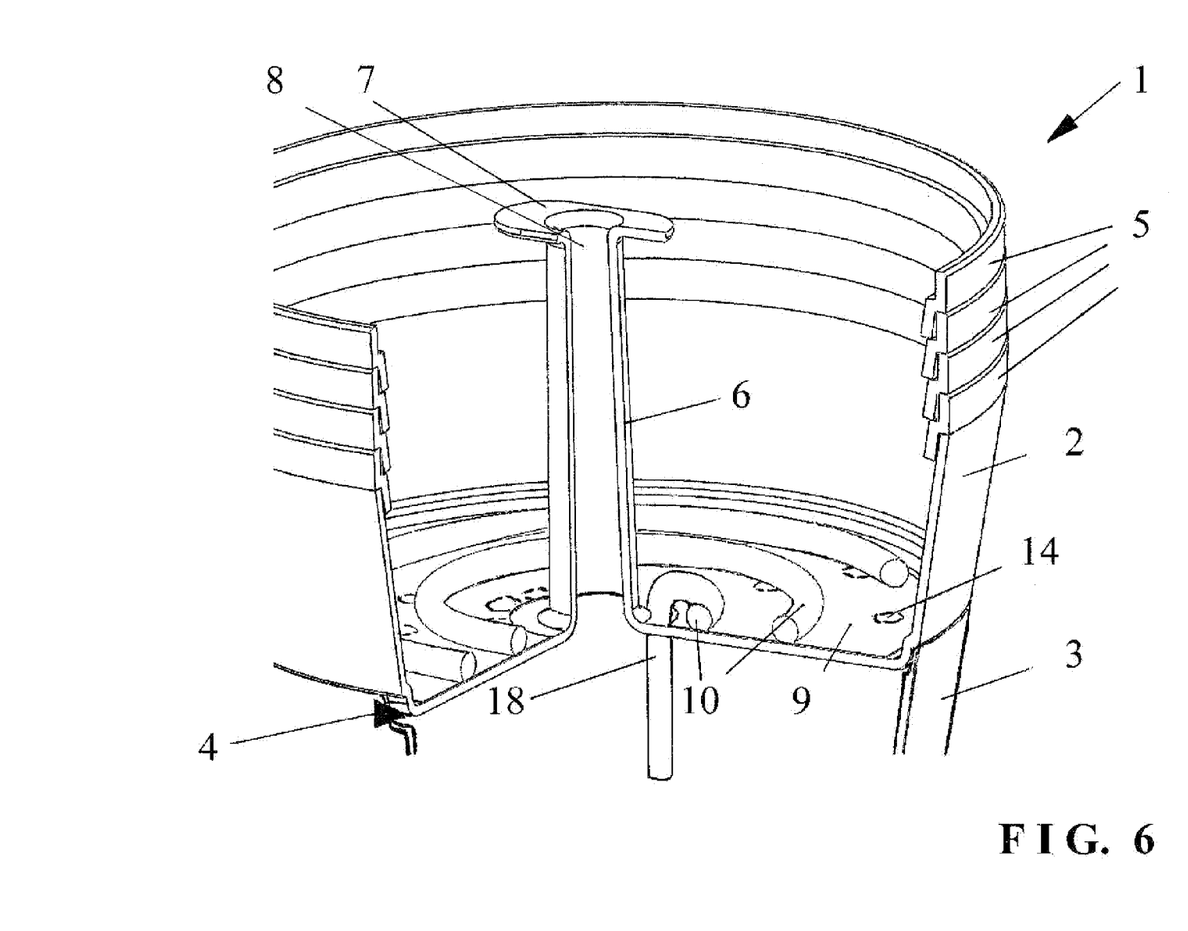
FIG. 6 is an enlarged section view of the top portion of the planter insert assembly shown in FIG. 5 and clearly showing the bottom surface of the tray above the bottom edge of the over-fill prevention hole in top edge of the base member, the wicking member distributed over the fluid-permeable membrane covering the perforations in the bottom surface of the tray, the end of the wicking member extending downwardly into the base member, four independently removable height-rings in stacked array secured to the top edge of the tray, and the fill-tube secured to the bottom surface of the tray having a central bore and a top handle.
Figures 7, 8:
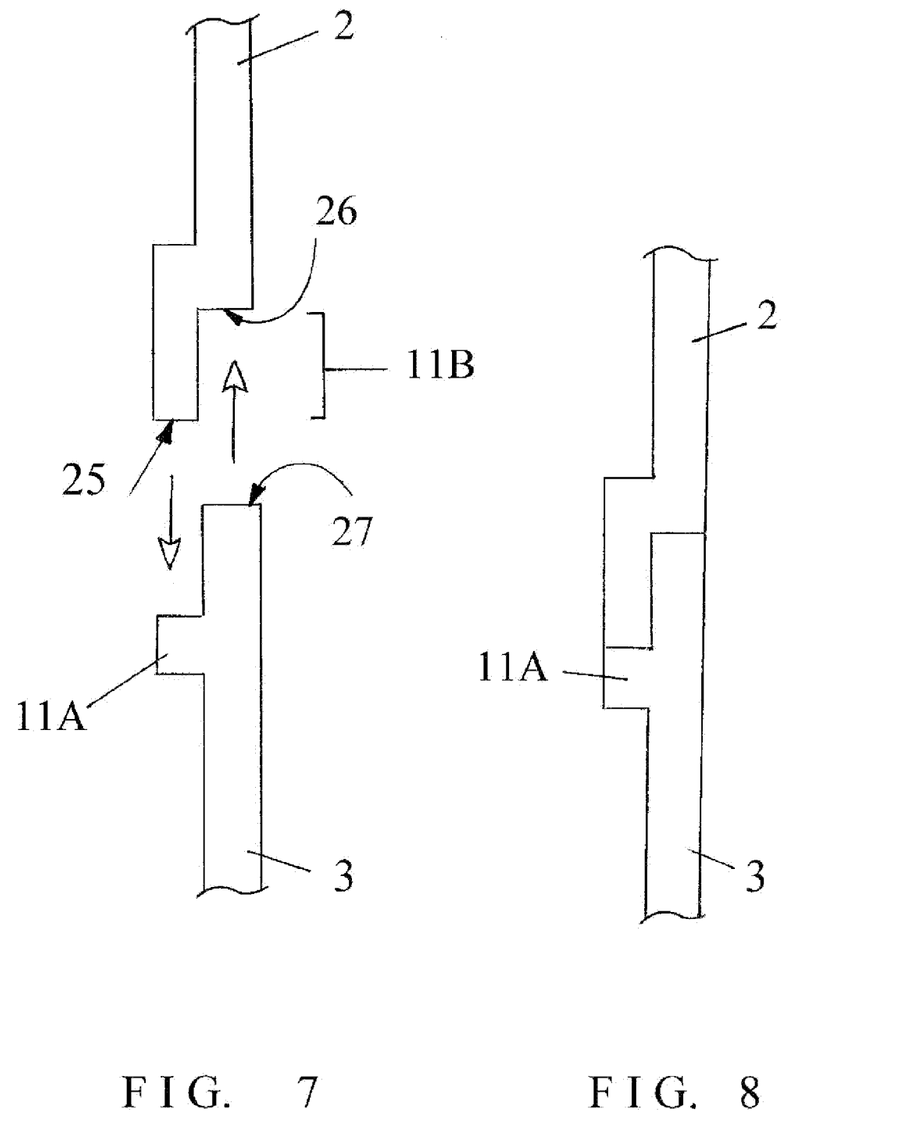
FIG. 7 is an exploded section view of the strong double-wall/double-ledge connection between the tray and the base member in the most preferred embodiment of the present invention where the top edge of the base member contacts substantially all of the inverted ledge of the cutout/notch on the bottom exterior perimeter surface of the tray, with the bottom edge of the vertically-extending wall portion of the cutout/notch area in the tray contacting the top surface of the interior rim situated below the top edge of the base member, with two arrows identifying the horizontally-extending surfaces that come into contact with one another when the bottom surface of the tray is joined to the base member for support.
FIG. 8 is a section view showing the tray and the base member in FIG. 7 in the assembled condition needed for use.

FIGS. 1-8 show differing views of the most preferred embodiment of the present invention planter insert assembly 1 which provides a significantly longer self-watering time period than is obtainable from all known prior art self-watering and self-contained systems in current use today for container-grown plants. While FIGS. 1, 2, 5, and 6 show both its tray 2 and base member 3, FIG. 3 shows an enlarged view of tray 2, FIG. 4 shows an enlarged view of a height-adjustment ring 5, and FIGS. 7 and 8 show the strong and stable double-wall/double-ledge configuration 11 achievable between tray 2 and base member 3 that is preferred during support of tray 2 by base member 3. Although the illustrations accompanying this disclosure show a planter insert assembly 1 having a circular cross-sectional configuration, it may have any size or shape suitable for accommodation within the planter or other container selected for use with it, whether that planter or container has the cross-sectional configuration of a circle, rectangle, hexagon, or other regular or non-regular polygon, or an irregular arcuate perimeter configuration. It is also preferred but not critical for the overall configuration of the joined tray 2 and base member 3 to have a slight narrowing downward taper, to allow a little more room in tray 2 for plant and root growth. Furthermore, more than one self-contained planter insert assembly 1 could be used within large containers, although a planter insert assembly 1 nearly the same size and shape of the planter or other container with which it is to be used is currently the most common application. In addition, since the present invention planter insert assembly 1 is typically hidden within a planter/container, it requires no decorative enhancement, although it may be made in a variety of colors or have various decorative surface texture patterns, designs, imprinted information, decals, informational stickers, and/or other decoration or attachment desired for marketing purposes. Applications include, but are not limited to, daily self-watering of plants in and around residential homes, shopping malls, commercial buildings, hotels, convention centers, and college campuses. Advantages of the present invention planter insert assembly 1 include structure that provides a constant/steady supply of water and fertilizer to plants, easy cleaning, no municipal power or water supply connections, significantly longer self-watering time periods, durable construction, and easy/prompt installation and assembly.

FIG. 1 shows planter insert assembly 1 comprising a tray 2 configured for holding plants and their growing/support medium, (or in the alternative potted plants in drainable containers) supported on a base member 3 having a top diameter dimension similar to that of the bottom of tray 2. Although not clearly shown in FIG. 1 (but shown in FIG. 5), base member 3 has a closed bottom surface 17 and side walls that define a fluid-holding interior. As shown in FIG. 1, planter insert assembly 1 has a top end with a greater width dimension than its bottom end, which is not critical, but determined according to the shape of the planter or other container (not shown) into which it will be placed during use. Thus, if the planter or other container (not shown) into which it will be placed has a top end with a greater width dimension than its bottom end, planter insert assembly 1 is also likely to have the configuration shown in FIG. 1. FIG. 1 also shows tray 2 having a centrally-positioned fill-tube 6 with a center bore 8, as well as a handle 7 at the top end of fill-tube 6. Central positioning of fill-tube 6 is not critical, and may vary depending upon the application. Fill-tube 6 is used for addition of fluid/nutrient 19 (see FIG. 5) to base member 3 without having to displace tray 2, as well as assessment of the amount of fluid/nutrient 19 remaining in base member 3 without having to move tray 2 or otherwise disturb plants and their support/growth medium supported by tray 2. The handle 7 secured to the top of fill-tube 6 is used for easily lifting and positioning tray 2 relative to base member 3 when base member 3 is already filled with fluid/nutrient 19 and positioned within a planter or other container (not shown), and should be sturdy enough to lift tray 2 while it is supporting the additional weight of plants and needed support/growth medium.

In addition, FIG. 1 shows four rings 5 in vertically-stacked array upwardly depending from the top edge of tray 2. Although four rings 5 are shown, fewer or more than four can be used. Rings 5 are selectively detachable as needed for planter insert assembly 1 to match the height of a planter or other container (not shown) into which planter insert assembly 1 is placed during use, if this is important to an application. Rings 5 can also create the optimal volume within tray 2 for the needed amount of support/growth media to provide proper plant irrigation. The size and shape of handle 7 are not critical as long as a good grip is provided for lifting tray 2, nor is the number of rings 5 used. Also, the height and thickness dimensions of rings 5 may be different from that shown in FIG. 1. In addition, FIG. 1 shows one over-fill prevention hole 4. Although it appears to be in the form of a notch with an open top end, it is also contemplated for over-fill prevention hole or holes 4 to have a closed perimeter shape, such as but not limited to that of a circle. The number of over-fill prevention holes 4 used in base member 3 is not limited to that shown in FIG. 1, and the size and placement of over-fill prevention holes 4 can also be different from that shown in FIG. 1 as long as it maximizes the fluid-holding capacity of base member 3 while concurrently prevents rising fluid/nutrient in base member 3 from blocking flow of excess rainwater (not shown) through perforations 14 (see FIGS. 2 and 3) in the bottom surface 13 of tray 2 via gravity into base member 3. If a planter or other container into which planter insert assembly 1 is placed has a much larger width dimension than planter insert assembly 1, more than one planter insert assembly 1 may be used to fill the available space. Also, although not limited thereto, the most preferred embodiments of the present invention self-watering planter insert assembly 1 comprise a base-member-to-tray volume that is approximately 4:1, although a minimum base-member-to-tray volume of least 2:1 is also contemplated. When a 4:1 nutrient/fluid-to-soil ratio is used, the self-watering time for plants grown indoors is at least two to three months, and longer self-watering time periods have been demonstrated for plants with low fluid requirements and those planter insert assemblies located outdoors and situated to receive at least occasional rainwater replenishment. In addition to structural considerations needed for tray 2 support, the structure and materials used for base member 3 must also be suitable for holding fluid/nutrient for extended periods of time without warping, sagging, or other structural alteration or modification. The structure and materials used for tray 2 must also be suitable for extended exposure to fluid/nutrient without warping, sagging, or other structural alteration or modification.

FIG. 2 is an exploded view of the planter insert assembly 1 in FIG. 1 that shows height-adjusting rings 5 are separable from one another and from tray 2. FIG. 2 also show a loosely coiled wicking member 10 having a downwardly-extending end piece (marked by the number 18 in FIG. 5), and fluid-permeable material 9 positioned under wicking member 10 and having a large opening 22 therein for insertion therethrough of the tray's fill-tube 6, with a smaller hole 23 used for insertion of the wicking member 10. Unless the handle 7 on the top of fill-tube 6 is detachable (such as with a threaded connection, but not limited thereto), to accommodate easy passage of fill-tube 6 and handle 7 through fluid-permeable material 9, large opening 22 may stretchable, have end slits (shown but not marked with numerical designation), or have other accommodation (not shown) that allows it to substantially regain its original configuration for successfully blocking the movement of soil or other plant support/medium through perforations 14 and 24 into base member 3. In addition, FIG. 2 shows tray 2 having a bottom surface 13 with multiple perforations (marked by the numbers 14 and 24 in FIG. 3), and base member 3 having one over-fill prevention hole 4 cut through its top edge (marked by the number 27 in FIG. 7). FIG. 2 further shows the cutout/notch area 11A in bottom perimeter edge of tray 2 that engages at least in part an interior rim 11B near the top surface of base member 3 to provide a strong and sturdy connection between tray 2 and base member 3. Although FIG. 2 shows planter insert assembly 1 having one wicking member 10, more can be used, each with a separate end piece 18 (see FIG. 5) extending into base member 3 to draw nutrient/fluid 19 (see FIG. 5) from base member 3 upwardly into soil or other plant growing medium (not shown) supported by tray 2 around plant roots (not shown). Whether one or multiple wicking members 10 are used, it is preferred that they are distributed substantially across material 9 for even distribution of nutrient/fluid 19 to plants. Furthermore, the configuration and width dimension of wicking members 10 used as a part of planter insert assembly 1 may vary from that shown in FIG. 2. The thickness of fluid-permeable material 9, the number of layers used, and the type of fabric or other material or materials used as a part of fluid-permeable material 9 may vary according to the flow rate of nutrient/fluid 19 needed from base member 3 to tray 3 to properly irrigate plants supported by tray 2. Plants may be in drainable pots supported by tray 2, or plant roots may be established in a growth or support medium (not shown) distributed within the tray-like interior surface of tray 2. In addition, it is contemplated for preferred embodiments of the present invention to be manufactured in several sizes to accommodate differing sizes and arrangements of container-grown plants.

Furthermore, although FIG. 2 shows base member 3 having only one over-fill prevention hole 4 through its top edge, which is preferred, more over-fill prevention holes 4 can be present and they may have differing size, shape, and elevation from that shown in FIG. 2. The elevation of over-fill prevention hole or holes 4 must be determined to prevent the fluid/nutrient in base member 3 from blocking the downward gravity-assisted flow of surplus/excess fluid/nutrient from tray 2, through fluid-permeable material 9, and into base member 3. Also, although preferred but not critical, the fill-tube 6 shown in FIG. 2 has a gradually tapering configuration upwardly toward its top distal end that minimizes interference with foliage in the plants rooted in tray 2. The tapering of fill-tube 6 is not limited to the configuration shown in FIG. 2 as long as it can fulfill its fluid/nutrient assessment and replenishment functions. In addition, fill-tube 6 does not necessarily need to be centered in tray 2. After the initial filling of base member 3 with nutrient/fluid 19, the hole 8 through fill-tube 6 may be used for occasional nutrient/fluid 19 replenishment in base member 3 without any need for separation of tray 2 from base member 3. In addition, the hole 8 through fill-tube 6 can also be used for fluid/nutrient level assessment in base member 3 shown in FIG. 1 without having to move tray 2 or otherwise disturb plants and their growing/support medium supported by tray 2. The hole 8 through fill-tube 6 may also be used for occasional addition of nutrients (not shown) lost to plants as they grow. It is preferred that all materials used in planter insert assembly 1 be non-toxic, water resistant, and unaffected by extended exposure to soil and nutrient/fluid. Resistance to breakdown from ultraviolet radiation is also a desirable material consideration for tray 2 and base member 3, although not critical.

FIG. 3 is an enlarged perspective view of tray 2 that shows its bottom surface 13 having larger perforations 24 and smaller perforations 14, a centrally-positioned fill-tube 6 with a center bore 8 and a top handle 7, and an exterior cutout/notch area 11B around its bottom perimeter edge. Although FIG. 3 shows fill-tube 6 centered within tray 2, centered positioning is not critical to the present invention and off-center positioning is also contemplated to be within its scope. The smaller perforations 14 are used as drain holes for transfer of surplus rainwater entering tray 2 and not immediately usable by plants into base member 3 for later upward movement via wicking member 10 into tray 2. In contrast, the enlarged perforations or holes 24 in tray 2 are used for passage of the end piece 18 of wicking member 10 into base member 3. A hole 23 in fluid-permeable material 9 complementary in size, shape, and alignment to that of at least one enlarged perforation 24 is also needed for passage of a wicking member 10 into lower member 3. The relative sizes of larger perforations 24 and smaller perforations 14 in FIG. 3 is merely provided as an example, and should not be construed as limiting. Furthermore, the number, placement, and spaced-apart distances of larger perforations 24 and smaller perforations 14 may vary from that shown in FIG. 3. In addition, the wall thickness, wall height, and interior volume of tray 2 may vary according to the type of plants contemplated for its use. Also, the location, size, and shape of fill-tube 6, bore 8, and top handle 7 are not limited to that shown in FIG. 3. In addition, soil or plant growth support media is often mounded toward center of tray 2, although center mounding is not critical. Thus, in many embodiments of planter insert assembly 1 the top of fill-tube 6 will extend above the top edge of tray 2 to reduce the opportunity for blockages caused by entry therein of soil or other plant growing media, however, it is also considered to be within the scope of the present invention for fill-tube 6 to have a height dimension substantially the same as, or less than, the height dimension of tray 2.

FIG. 4 is a perspective view of a ring 5 usable as a part of the most preferred embodiment of the present invention planter insert assembly 1 for height adjustment. FIG. 4 shows its interior ledge 15 and the lower exterior indentation 16 used for easily detachable engagement of adjacent rings 5 to one another for vertical stacking of multiple rings 5 one upon the other while the bottommost ring 5 attaches to the top edge of tray 2, as shown in FIG. 1. As can also be seen in FIG. 1, multiple rings 5 have secure and visibly protrusion-free stacked attachment one upon the other, and also to the top edge of tray 2, causing no horizontally-extending protrusions to become outwardly depending from the interior or exterior surface of the combined ring 5 and tray 2 structure. The height dimension of each ring 5 used can vary from that shown in FIG. 4. However, as shown in FIG. 1, the height dimension in each ring 5 above its interior ledge 15 in the most preferred embodiment of the present invention is less than one-fourth of the height dimension of tray 2 and less than one-tenth of the height dimension of base member 3. Also, the perimeter configuration of ring 5 is contemplated to be comparable to that of the top edge of tray 2 so that it can be easily attachable thereto and detachable therefrom for adjusting the interior volume of tray 2 so that it is able to provide adequate and proper irrigation to plants rooted therein. It is preferred that all materials used in rings 5 be non-toxic, water resistant, and unaffected by extended exposure to soil and nutrient/fluid. Resistance to breakdown from ultraviolet radiation is also a desirable material consideration for rings 5, although not critical.

FIGS. 5 and 6 are both partial section views of tray 2 while it is being supported by base member 3. FIGS. 5 and 6 both show multiple height-adjustment rings 5 attached in a stacked vertically-extending array to the top edge of tray 2, and tray 2 having a preferably upwardly-tapering fill-tube 6 that provides more volume within tray 2 for plants (not shown). FIGS. 5 and 6 also both show the handle 7 depending from the top end of fill-tube 6 and its central hole 8 used for assessment and replenishment of fluid/nutrient 19 in base member 3. In addition, FIGS. 5 and 6 both show fluid-permeable material 9 positioned within and substantially covering the bottom surface of tray 2 and its perforations 14, one wicking member 10 distributed across fluid-permeable material 9 in a manner allowing even distribution to plants growing in tray 2, and one end piece 18 of wicking member 10 passing through fluid-permeable material 9 and the bottom surface 13 of tray 2 via one of its perforations 14 or 24. Furthermore, FIGS. 5 and 6 show one over-fill prevention hole 4 cut into the top perimeter edge of base member 3 that is sized and positioned to prevent rising fluid/nutrient 19 in base member 3 from coming into direct contact with the bottom surface 13 of tray 2, blocking the drainage via gravity of excess fluid/nutrient 19 from tray which otherwise accumulate in tray 2 and eventually harm plant roots. Another feature shown by both FIGS. 5 and 6 is the strong double-wall/double-ledge connection 11 (also see FIGS. 7 and 8) between the bottom exterior cutout edge of tray 2 and the interior rim 11B of base member 3. FIG. 5 additionally shows one of the ends 18 of wicking member 10 extending through a perforation in the bottom surface of the tray that is aligned with a perforation in the fluid-permeable material 9 so that end piece 18 can reach fluid/nutrient 19 in base member 3 and transport it upwardly into tray 2 to the roots of plants supported by growing media distributed therein. FIG. 5 also shows the closed bottom surface 17 of base member 3, fluid/nutrient 19 within base member 3 and surrounding the end piece 18 of wicking member 10, and a drain hole 20 in the lower portion of base member 3 covered by a removable cap/seal 21. The number, size, positioning, and configuration of drain hole 20 and cap/seal 21 may be different from that shown in FIG. 5.

FIGS. 7 and 8 show the strong double-wall/double-ledge connection 11 between tray 2 and base member 3 in the most preferred embodiment of present invention planter insert assembly 1. FIG. 7 is an exploded section view thereof with tray 2 and base member 3 poised for making the double-wall/double-ledge connection 11, where the top edge 27 of base member 3 contacts substantially all of the inverted ledge 26 of the cutout/notch area 11B on the exterior bottom perimeter of tray 2, with the bottom edge 25 of the vertically-extending wall portion of cutout/notch area 11B in tray 2 contacting the top surface of the interior rim/ledge 11A situated slightly below the elevation of the top edge 27 of base member 3. Two double-headed arrows point to and identify the surfaces (26 and 27, 25 and 11A) that come into contact with one another during present invention use. FIG. 8 is an enlarged section view showing tray 2 and base member 3 in the assembled condition needed for extended self-watering use of plants rooted in soil or other growing medium supported by tray 2. It is preferred for interior rim/ledge 11A to extend around the entire interior surface of base member 3 close to, but at a spaced-apart distance from, its top edge 27. It is also preferred for the size of interior rim 11A to be small so as to not block or diminish gravity-assisted flow of rainwater from tray 2 to base member 3, however it should have sufficient width, height, and thickness dimension to provide sturdy support for, and engagement with portions of the cutout/notch area 11B around the bottom perimeter of tray 2.

I claim:
1. A planter insert assembly, said planter insert assembly comprising:
a tray having a bottom surface with a plurality of perforations, said tray also having a fill-tube upwardly depending from said bottom surface, said fill-tube defining a bore allowing for addition of liquid therethrough, wherein said fill-tube has an upwardly tapered configuration, wherein said fill-tube has a top end and a bottom end, wherein said top end of said fill-tube is narrower than said bottom end of said fill tube, said tray also having a wall structure upwardly depending from said bottom surface, said tray defining a containment space for plant support media, said wall structure having a top perimeter edge, said tray also having an external bottom perimeter edge, said external bottom perimeter edge defining a notch providing an inverted ledge;

fluid-permeable material covering said plurality of perforations in said bottom surface of said tray and having at least one opening therethrough aligned with one of said perforations in said bottom surface;
a base member made from water impenetrable material and having a closed bottom surface and an interior wall contiguous with said closed bottom surface, wherein said closed bottom surface and said interior wall of said base member define a fluid-holding interior allowing fluid collection and storage therein, said base member also having an open top end having a top perimeter edge, said base member including an interior rim projecting inwardly from said interior wall and having a top surface, said base member further having a perimeter configuration larger than that of said bottom surface of said tray, said top surface of said interior rim of said base member engaging said external bottom perimeter edge of said tray, and said top perimeter edge of said open top end of said base member engaging said inverted ledge of said tray when said tray is supported by said base member, wherein the liquid added through said bore exits said fill-tube through said bottom surface of said tray, thereby at least partially filling said base member, said base member also having at least one fluid overflow hole positioned at least in part below said interior rim; and
at least one wicking member having a first opposed end and a second opposed end, with said first opposed end positioned on said fluid-permeable material and said second opposed end extending into said base member's fluid-holding interior through said one of said at least one opening through said fluid-permeable material aligned with said one of said perforations in said bottom surface of said tray, wherein said fluid-permeable material is positioned on said bottom surface of said tray to allow only fluid to move from said tray into said base member, wherein said at least one wicking member extends from said tray downwardly into said base member and draws fluid in said base member upwardly into said tray for continuous self-watering of plants supported by said tray without over-saturation of plant roots, wherein said at least one fluid overflow hole in said base member allows exit of surplus fluid in said base member.

2. The planter insert assembly of claim 1 wherein said fill-tube has a top end and a handle connected to said top end, said handle allowing for positioning of said tray relative to said base member.

3. The planter insert assembly of claim 1 further comprising at least one detachable height-adjusting ring having an interior ledge and a lower exterior indentation collectively providing secure and visibly protrusion-free stacked association with said top perimeter edge of said tray and with one another when at least two of said at least one detachable height-adjusting ring are present.

4. The planter insert assembly of claim 3 wherein each of said at least one detachable height-adjusting ring has a top edge allowing selective attachment of another of said at least one detachable height-adjusting ring thereto for selectively increasing the height of said planter insert assembly.

5. The planter insert assembly of claim 1 wherein at least one of said perforations in said perforated bottom surface of said tray is enlarged to accommodate easy insertion therethrough of said at least one wicking member.

6. The planter insert assembly of claim 1 wherein said base member includes a lower portion having a drain hole.

7. The planter insert assembly of claim 6 further comprising a threaded cap configured to seal said drain hole of said lower portion.

8. The planter insert assembly of claim 1 wherein said fluid-holding interior of said base member has a volume that is at least two times a volume of said tray.

9. The planter insert assembly of claim 8 wherein said fluid-holding interior of said base member has a volume that is approximately four times said volume of said tray.

10. A planter insert assembly for prolonged self-watering of container-grown plants, said planter insert assembly comprising:
a tray having a bottom surface with a plurality of perforations, said tray having a volume, said tray also having a fill-tube upwardly depending from said bottom surface of said tray, said tray also having a top end with a handle, said handle allowing for positioning of said tray relative to said base member, said fill-tube defining a bore allowing for addition of liquid therethrough, wherein said fill-tube has an upwardly tapered configuration, wherein said fill-tube has a top end and a bottom end, wherein said top end of said fill-tube is narrower than said bottom end of said fill tube, said tray also having a wall structure upwardly depending from said bottom surface, said tray defining a containment space for plant support media, wherein at least one of said plurality of perforations is larger than the other perforations of said plurality of perforations, said wall structure having a top perimeter edge, said tray also having an external bottom perimeter edge, said external bottom perimeter edge defining a notch providing an inverted ledge;
at least one detachable height-adjusting ring having an interior ledge and a lower exterior indentation collectively providing secure and visibly protrusion-free stacked association with said top perimeter edge of said tray and with one another when at least two of said at least one detachable height-adjusting ring are present;
fluid-permeable material covering said plurality of perforations in said bottom surface of said tray and having at least one opening therethrough aligned with one of said perforations in said bottom surface;
a base member made from water impenetrable material and having a closed bottom surface and an interior wall contiguous with said closed bottom surface, said closed bottom surface and said interior wall of said base member defining a fluid-holding interior allowing fluid collection and storage therein, said fluid-holding interior having a volume that is at least two times the volume of said tray, said base member also having an open top end having a top perimeter edge, said base member including an interior rim projecting inwardly from said interior wall and having a top surface, said base member further having a perimeter configuration larger than that of said bottom surface of said tray, said top surface of said interior rim of said base member engaging said external bottom perimeter edge of said tray, and said top perimeter edge of said open top end of said base member engaging said inverted ledge of said tray when said tray is supported by said base member, wherein the liquid added through said bore exits said fill-tube through said bottom surface of said tray, thereby at least partially filling said base member, said base member also having at least one fluid overflow hole positioned at least in part below the elevation of said interior rim; and at least one wicking member having a first opposed end, a second opposed end, and a width dimension configured for insertion of said at least one wicking member through at least one of said plurality of perforations in said bottom surface of said tray, wherein said first opposed end is positioned on said fluid-permeable material, said second opposed end extending into said fluid-holding interior of said base member through one of said at least one opening in said fluid-permeable material aligned with one of said plurality of perforations in said bottom surface of said tray, wherein said fluid-permeable material is positioned so as to only allow fluid to move from said tray into said base member, said at least one wicking member extending from said tray downwardly into said base member and drawing fluid in said base member upwardly into said tray for continuous self-watering of plants supported by said tray without over-saturation of plant roots, wherein said at least one fluid overflow hole in said base member allows exit of surplus fluid in said base member, thereby preventing fluid from moving upwardly into contact with said tray, wherein excess rainwater entering said tray that is not immediately used by plants planted in the plant support media supported by said tray moves downwardly via gravity into said base member for later distribution to the plants supported by said tray via said at least one wicking member.

11. The planter insert assembly of claim 10 wherein said fluid-holding interior of said base member has a volume that is approximately four times a volume of said tray.

12. The planter insert assembly of claim 10 wherein said base member includes a lower portion having a drain hole with a removable cap.

13. The planter insert assembly of claim 10 wherein said base member a height dimension, wherein each of said at least one detachable height-adjusting ring has a height dimension, wherein the height dimension of each of said at least one detachable height-adjusting ring is less than one-tenth of said height dimension of said base member.

14. The planter insert assembly of claim 10 wherein said base member has a height dimension, wherein each of said at least one detachable height-adjusting ring has a height dimension, wherein each height dimension of said at least one detachable height-adjusting ring is less than one-tenth of said height dimension of said base member.

15. A planter insert assembly, comprising:
a tray defining a containment space for plant support media, said tray having a bottom surface with a plurality of perforations allowing for insertion of at least one wicking member, said tray also having a fill-tube upwardly depending from said bottom surface, said fill-tube defining a bore, wherein said fill-tube has an upwardly tapered configuration, wherein said fill-tube has a top end and a bottom end, wherein said top end of said fill-tube is narrower than said bottom end of said fill-tube, said tray also having an external bottom perimeter edge defining a notch, said notch providing an inverted ledge; and
a base member having a closed bottom surface and an interior wall contiguous with said closed bottom surface, said closed bottom surface and said interior wall of said base member defining a fluid-holding interior cavity, said base member also having an open top end having a top perimeter edge, said base member including an interior rim projecting inwardly from said interior wall, said interior rim of said base member having a top surface, said top surface of said interior rim of said base member engaging said external bottom perimeter edge of said tray, and said top perimeter edge of said open top end of said base member engaging said inverted ledge of said tray when said tray is supported by said base member, wherein liquid added to said bore exits said fill-tube through said bottom surface of said tray and at least partially fills said fluid-holding interior cavity of said base member.

16. The planter insert assembly of claim 15, further comprising:
at least one wicking member, each of the at least one wicking member having a first end and a second end, wherein each first end is disposed above said bottom surface of said tray, each second end extending into said fluid-holding interior of said base member through one of said plurality of perforations in said bottom surface of said tray.

17. The planter insert assembly of claim 16, further comprising:
fluid-permeable material covering said perforations in said bottom surface of said tray, said fluid-permeable material defining at least one opening, wherein each of said at least one opening defined in said fluid-permeable material is aligned with one of said plurality of perforations in said bottom surface, wherein each of said at least one wicking member is inserted through one of said at least one opening defined in said fluid-permeable material.

* * * * *